D. L. BADLEY.
Tire Upsetting Machines.

No. 141,687.          Patented August 12, 1873.

Witnesses:          Inventor:
D. L. Badley
Per
Attorneys.

UNITED STATES PATENT OFFICE.

DURBIN L. BADLEY, OF AFTON, IOWA.

IMPROVEMENT IN TIRE-UPSETTING MACHINES.

Specification forming part of Letters Patent No. 141,687, dated August 12, 1873; application filed June 14, 1873.

*To all whom it may concern:*

Figure 1:
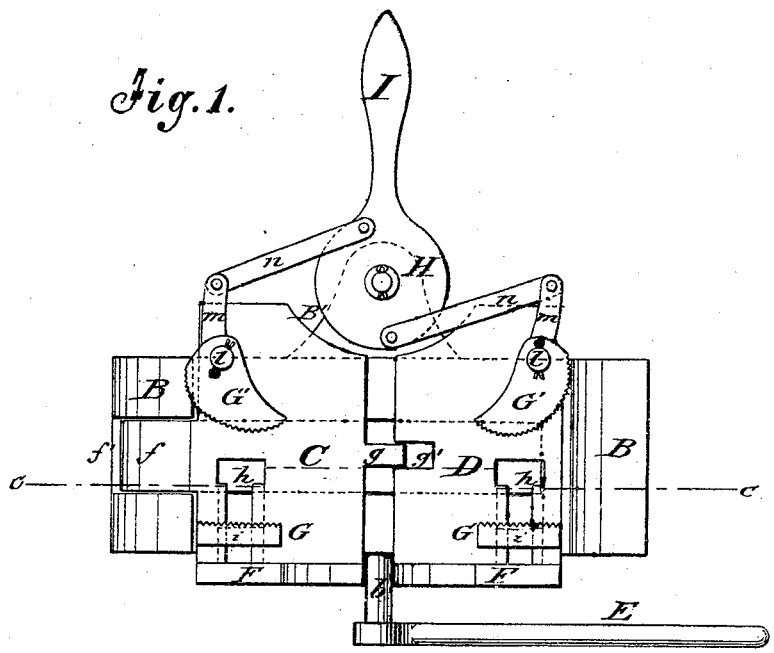
Figure 2:
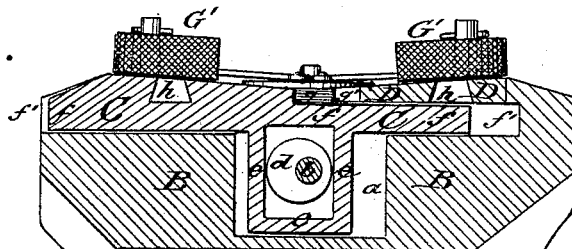

Be it known that I, DURBIN L. BADLEY, of Afton, in the county of Union and State of Iowa, have invented a new and Improved Tire-Shrinker, of which the following is a specification:

In the accompanying drawing, Figure 1 represents a top view of my improved machine for shrinking tires, and Fig. 2 a vertical longitudinal section of the same on the line $c\ c$, Fig. 1.

Similar letters of reference indicate corresponding parts.

The object of my invention is to furnish a convenient, strong, and durable tire-shrinker, which accomplishes by its powerful action the tightening or shrinking of tires, with less time and labor than similar devices hitherto in use. The invention consists in the construction and arrangement of a sliding plate operated by an eccentric lever and a stationary plate carrying fixed blocks, and pivoted segmental blocks operated by a suitable mechanism, all as hereinafter described.

In the drawing, A represents the frame of the shrinker, consisting of strong legs of wood or metal, which are connected by strong bolts. Frame A supports a heavy oblong block, B, also of suitable material, to which the sliding and stationary top plates C and D are connected. Block B is provided with a transverse recess, $a$, and suitable bearings for the shaft $b$ of crank-lever E, which shaft carries a small eccentric, $d$. Eccentric $d$ acts on an extension, $e$, of sliding plate C, which is placed under the longitudinally-extending part $f$ of plate C. Part $f$ is guided in a corresponding longitudinal recess, $f'$, of block B. A central lug, $g$, of plate C slides into recess $g'$ of stationary plate D, so that by turning crank E an even gradual approach of the plates C and D is produced. Both plates, C and D, have vertical end flanges or projecting parts F, from which undercut slots $h$ extend parallel to shaft $b$ to about the middle of both plates. Oblong blocks G having "rasp-cut" faces and dovetailed extension $i$ at their base are slipped through the broader end-opening of slot $h$, and along the same and supported against parts F by suitable metallic wedge-blocks, so that blocks G can neither be lifted out of plates C D, nor be forced backward. Segmental blocks G' are cut in similar manner on the sides facing blocks G, and are pivoted to plates C D at $l\ l$. The arms $m$ of blocks G' extend toward the rear and are pivoted to levers $n$, which are eccentrically and symmetrically pivoted on disk H with handle I, which disk is centrally pivoted to side extension B' of block B. The turning of disk H to one side presses the segmental blocks G' against blocks G, so that the tire can be firmly clamped between the rough uneven surfaces of these blocks. The reversing of disk H releases the tire. When the tire is firmly clamped the forward or backward motion of lever E carries plate C toward or away from plate D, so that the shrinking or loosening of the tire in slow and powerful manner is obtained.

Having thus described my invention, I claim as new, and desire to secure by Letters Patent—

The improved tire-shrinker, consisting of frame A, base-block B, sliding plate C, and stationary plate D, which carry blocks G and segmental blocks G' with arms $m$, lever $n$, disk H, shaft $b$, eccentric $d$, and lever E, substantially as and for the purpose described.

DURBIN L. BADLEY.

Witnesses:
J. W. ALLEY,
J. F. BISHOP.